US012688561B2

(12) United States Patent
Cong et al.

(10) Patent No.: US 12,688,561 B2
(45) Date of Patent: Jul. 21, 2026

(54) IMAGE PROCESSING METHOD FOR REMOVAL OF GLARE SPOTS AND SYSTEM FOR THE SAME

(71) Applicant: Continental Automotive Technologies GmbH, Hannover (DE)

(72) Inventors: Weiquan Cong, Singapore (SG); Keng Loong Lim, Singapore (SG); Yau Wai Lucas Hui, Singapore (SG); Guoji Wang, Singapore (SG); Heng Guo, Singapore (SG)

(73) Assignee: CONTINENTAL AUTOMOTIVE TECHNOLOGIES GMBH, Hanover (DE)

( * ) Notice: Subject to any disclaimer, the term of this patent is extended or adjusted under 35 U.S.C. 154(b) by 319 days.

(21) Appl. No.: 18/138,975

(22) Filed: Apr. 25, 2023

(65) Prior Publication Data

US 2023/0342891 A1 Oct. 26, 2023

(30) Foreign Application Priority Data

Apr. 25, 2022 (GB) ..................................... 2205975

(51) Int. Cl.
*G06T 5/77* (2024.01)
*G06T 7/00* (2017.01)
*G06T 7/70* (2017.01)

(52) U.S. Cl.
CPC .............. *G06T 5/77* (2024.01); *G06T 7/0002* (2013.01); *G06T 7/70* (2017.01); *G06T 2207/10016* (2013.01); *G06T 2207/30168* (2013.01)

(58) Field of Classification Search
None
See application file for complete search history.

(56) References Cited

U.S. PATENT DOCUMENTS 8,212,857 B2 7/2012 Keam
10,496,163 B2 * 12/2019 Siddiqui .............. G06V 40/193
(Continued)

FOREIGN PATENT DOCUMENTS

EP 1908396 A1 4/2008
EP 3259734 A1 12/2017
(Continued)

OTHER PUBLICATIONS

T. Sandhan et al. "Anti-Glare: Tightly Constrained Optimization for Eyeglass Reflection Removal", 2017 IEEE Conference on Computer Vision and Pattern Recognition (CVPR), Honolulu, HI, 2017, pp. 1675-1684, doe: 10.1109/CVPR.2017.182.
(Continued)

*Primary Examiner* — Ian L Lemieux
(74) *Attorney, Agent, or Firm* — Buchanan Ingersoll & Rooney PC

(57) ABSTRACT

An image processing method for removal of glare spots appearing on images captured is disclosed. The method comprises transmitting, by way of a first illumination source, a first light ray towards a first gaze and by way of a second illumination source, a second light ray towards a second gaze. An image sensor captures a first gaze image comprising an image of the first gaze and captures a second gaze image comprising an image of the second gaze. A saturation spot removal algorithm selects a primary gaze image between the first gaze image captured and the second gaze image captured, in which the primary gaze image selected is suitable for removing a glare spot to yield a resultant gaze image for ascertaining a gaze direction, for eye tracking functions. A system, a computer program product, and a computer-readable medium of the same is also disclosed.

15 Claims, 9 Drawing Sheets

(56) References Cited

U.S. PATENT DOCUMENTS

| | | | | |
|---|---|---|---|---|
| 10,872,402 | B2 * | 12/2020 | Pasula | G06V 10/60 |
| 11,209,898 | B2 * | 12/2021 | Kaehler | G06T 3/4053 |
| 2014/0313401 | A1 | 10/2014 | Rihn et al. | |
| 2015/0310253 | A1 | 10/2015 | Agrawal et al. | |
| 2016/0103484 | A1 | 4/2016 | Guo et al. | |
| 2016/0125241 | A1 * | 5/2016 | Ebisawa | G06T 7/77 |
| | | | | 348/78 |
| 2016/0358009 | A1 * | 12/2016 | Agrawal | G06V 40/193 |
| 2018/0039846 | A1 * | 2/2018 | Grubb | G06N 20/00 |
| 2018/0081427 | A1 | 3/2018 | Siddiqui et al. | |
| 2020/0143189 | A1 * | 5/2020 | Shiota | G06V 40/19 |
| 2020/0183490 | A1 * | 6/2020 | Klingström | G06T 7/73 |
| 2021/0118108 | A1 * | 4/2021 | Noble | G06V 40/18 |
| 2021/0181837 | A1 | 6/2021 | Jiang et al. | |
| 2023/0005180 | A1 * | 1/2023 | Zachrisson | G06T 7/74 |
| 2024/0153311 | A1 * | 5/2024 | Akashi | G06F 3/013 |

FOREIGN PATENT DOCUMENTS

| | | | |
|---|---|---|---|
| EP | 3650991 | A1 | 5/2020 |
| JP | 2010244156 | A | 10/2010 |
| JP | 2020075596 | A | 5/2020 |
| KR | 10-2016-0146858 | A | 12/2016 |
| WO | 0249506 | A1 | 6/2002 |
| WO | 2016131075 | A1 | 8/2016 |
| WO | 2018000020 | A1 | 1/2018 |

OTHER PUBLICATIONS

Search Report dated Oct. 5, 2022 from corresponding GB patent application No. 2205975.2.
Search Report dated Sep. 19, 2023 from corresponding European patent application No. 23154577.3.
Notice of Reasons for Refusal mailed on Feb. 14, 2024 from corresponding Japanese patent application No. 2023-021687.
Decision of Grant mailed on Jul. 3, 2024 from corresponding Japanese patent application No. 2023-021687.
Office Action (Communication pursuant to Article 94(3) EPC) issued May 20, 2025, by the European Patent Office in corresponding European Patent Application No. 23 154 577.3-1218. (6 pages).
Office Action (Notice to Submit Response) issued Dec. 17, 2025, by the Korean Intellectual Property Office in corresponding Korean Patent Application No. 10-2023-0050324 and an English translation of the Office Action. (10 pages).
Office Action (Communication pursuant to Article 94(3) EPC) issued Nov. 27, 2025, by the European Patent Office in corresponding European Patent Application No. 23 154 577.3-1218. (4 pages).

* cited by examiner

300a

306

304

302

(A)

108

110

106

300b

306

304

302

(A)

108

110

106

IMAGE PROCESSING METHOD FOR REMOVAL OF GLARE SPOTS AND SYSTEM FOR THE SAME

CROSS REFERENCE TO RELATED APPLICATION

This U.S. patent application claims the benefit of GB patent application No. 2205975.2, filed Apr. 25, 2022, which is hereby incorporated by reference.

TECHNICAL FIELD

This disclosure relates to image processing and in particular processing of images to identify glare spots appearing in images. More specifically, the disclosure describes a method and system to remove glare spots and predict a gaze direction from images processed, for eye tracking applications.

BACKGROUND

Eye tracking applications has its presence in electronics industry for years. Eye tracking functions has been applied to medical fields, consumer electronics such as head mounted displays, augmented reality (AR) or virtual reality (VR) applications.

In recent years, eye tracking function applications also appeals to automotive industry, to track gaze direction of driver, to determine a best position to display vehicular information in line-of-sight of drivers, for comfort and safety reasons. However, eye tracking within a passenger cabin of a motor vehicle has many challenges. Firstly, passenger cabins are typically dimly lit, thus images captured usually requires some processing to extract information. Further, for eye tracking applications, a spotlight source is usually required, for illumination purposes, and this light source may be a source of stray light caused by reflective surfaces within the passenger cabin. At times, driver may also be wearing eyewear such as spectacles or sunglasses, which causes the light rays from the spot light to be reflected and transmit towards the eye cornea, which then appear as glare spots in images, covering area of the cornea image captured.

A conventional technique to reduce glare spots revealing on images captured is to use optical elements such as filters placed forward of camera lens to achieve a degree of polarization. However, a disadvantage of using polarizing filters to achieve polarization is the reduction of luminous flux received by the camera, i.e., light absorption is greatly reduced. Another known technique is the use of multiple illuminators strategically placed, relative to the driver, such that transmission of light rays towards the driver's eye cornea is controlled. Nonetheless, such systems are complex to design and expensive due to the increase in the number of electronic components required to achieve desired technical results. Notwithstanding the aforesaid challenges, a cockpit of a motor vehicle is usually constrained by space, thus such system designs are not feasible in all types of motor vehicles, for example passengers vehicles.

Thus, it may be seen, the challenges of eye tracking within a cabin of a motor vehicle remains unresolved.

SUMMARY

There is therefore a need to provide a method for identifying glare spots appearing on images captured and system of the same that overcomes, or at least ameliorates, the problems described above. Furthermore, other desirable features and characteristics will become apparent from the subsequent detailed description and the appended claims, taking in conjunction with the accompanying drawings and this background of the disclosure.

A purpose of this disclosure is to ameliorate the problem of inaccuracy of gaze direction prediction by providing the subject-matter of the independent claims.

The objective of this disclosure is solved by an image processing method for removal of glare spots appearing on images captured, in which the method comprises transmitting, by way of a first illumination source, a first light ray towards a first gaze, and by way of a second illumination source, a second light ray towards a second gaze, capturing, by way of an image sensor, a first gaze image comprising an image of the first gaze, and a second gaze image comprising an image of the second gaze, selecting, by way of a saturation spot removal algorithm, a primary gaze image between the first gaze image captured and the second gaze image captured, and wherein the primary gaze image is selected for a saturation spot removal process, to yield a resultant gaze image for ascertaining a gaze direction, for eye tracking applications.

The above described aspect of this disclosure yields a method of selecting a primary image from two or more images captured of a first gaze and a second gaze of a user, to prepare for glare spot removal processing. Ideally, the selection of the primary image is on a basis that there is no overlapping glare spot interfering a glint spot position present in the image. Thus, the aforesaid image processing method yields a faster processing time and yield reliable results to determine gaze direction since overlapping glare spots is much more difficult to be distinguish from a glint.

In an embodiment, a method as described above further comprises identifying, by way of the saturation spot removal algorithm, at least one saturation spot resembling a glare spot and/or a saturation spot resembling a glint spot appearing in the primary gaze image selected.

The above aspect of this disclosure is to select a primary image for glare removal processing, by identifying a position of at least one saturation spot resembling a glare spot, and/or a saturation spot resembling a glint spot. In the event no glare spot is identified in either a left gaze image or a right gaze image, the gaze image with no glare spot identified is selected as the default primary image. This avoids selection of gaze image with overlapping spots, which may become time consuming to identify and remove glare spots. In this manner, the method disclosed only selects the most promising gaze image from multiple gaze images captured, as the primary gaze image.

In an embodiment, a method as described above further comprises removing, by way of the saturation spot removal algorithm, the saturation spot resembling a glare spot from the primary gaze image selected.

The above aspect of this disclosure is to process the primary gaze selected, such that no glare spot appears on the primary gaze image. This allows the saturation spot removal algorithm to identify a glint spot present in the primary gaze image with glare spots removed, such that a gaze direction may be ascertained, to prepare for eye tracking function.

In an embodiment, a method as described above further comprises capturing, by way of the image sensor, the first gaze image and the second gaze image in a continuously alternating sequence.

The above aspect of this disclosure is to obtain images continuously in an alternating mode or sequence, to improve observation of gaze images captured under multiple scenarios. This increases the chances of observation coverage, such that gaze direction may always be observed in at least one type of scenario. Further, this method reduces the effective frame rate by half. For example, when an image sensor operating at 60 frames per second (fps), the actual useable image frame rate is reduced to 30 fps, which has the benefit of observing actions or behavior at high accuracy.

In an embodiment, a method as described above in which the continuously alternating sequence comprises in an initial sequence, capturing the first gaze image in response to the first light rays being transmitted toward the first gaze; and in a subsequent sequence, capturing the second gaze image in response to the second light rays being transmitted toward the second gaze.

The above aspect of this disclosure is to apply an alternating switching mode to switch on and switch off the illumination sources alternatively. By way of an example, the alternating switching mode may switch on the first illumination source while the second illumination source is switch off when the image sensor captures a first gaze image and subsequently switch off the first illumination source while the second illumination source is switch on. This alternating switching mode to illuminate the first gaze followed by a second gaze reduces frame per second by half. Under most circumstances, the position of the first gaze and the position of the second gaze will be near identical positions although two different gaze images are captured. This is achieved by keeping two illumination sources at a relatively close physical distance, say, the respective components are less than 10 cm apart.

In an embodiment, a method as described above in which the alternating sequence continuously further comprises continuously executing, by way of the saturation spot removal algorithm, one initial sequence for capturing the first gaze image, followed by one subsequent sequence for capturing the second gaze image.

The above aspect of this disclosure is to continuously capture a first gaze image followed by a second gaze image in a continuous sequence to achieve reduction of frames per second, thereby achieving a better observation coverage.

In an embodiment, a method as described above in which the alternating sequence continuously further comprises continuously executing, by way of the saturation spot removal algorithm, at least two sequences of the initial sequence for capturing the first gaze image, followed by at least two sequences of the subsequent sequence for capturing the second gaze image.

The above aspect of this disclosure is to continuously capture at least two first gaze image followed by at least two second gaze image in a continuous sequence to achieve reduction of frames per second, to improve observation coverage of the gaze images captured.

In an embodiment, a method as described above in which identifying the saturation spot resembling a glare spot and identifying the saturation spot resembling a glint spot further comprises identifying, by way of the saturation spot removal algorithm, at least one saturated pixel area, by comparing the first gaze image captured against the second gaze image captured.

The above aspect of this disclosure is to yield a method of identifying a glare spot appearing on the images captured. An area resembling a glare spot may be saturated pixel. To distinguish a glare spot from a glint spot, the algorithm may further make an area size comparison, where the glare spot has a larger highly pixelated or saturated pixel area.

In an embodiment, a method as described above further comprises classifying, by way of the saturation spot removal algorithm, the saturated pixel area as the saturation spot resembling a glare spot.

The above aspect of this disclosure is to identify glare spots to prepare for glare spots removal process by correlating saturated or saturated pixel spots as potential glare spots.

In an embodiment, a method as described above further comprises removing, by way of the saturation spot removal algorithm, the saturated pixel area resembling a glare spot from the primary gaze image, and replacing, by way of the saturation spot removal algorithm, the saturated pixel area resembling a glare spot with a corresponding area obtained from one of the first gaze image or one of the second gaze image captured.

The above aspect of this disclosure is to minimize the information loss due to removal of pixel saturated spot by replacing the spot removed with a corresponding area to complement the existing information in the primary image. In this way, this aspect of the invention mitigates loss of information.

In an embodiment, a method as described above further comprises determining, by way of the saturation spot removal algorithm, a glint spot present in the resultant gaze image.

The above aspect of this disclosure is to determine a glint spot present in the resultant image, to determine a gaze direction.

In an embodiment, a method as described above further comprises ascertaining, by way of the saturation spot removal algorithm, a gaze direction according to a position of the glint spot determined on the resultant image, for eye tracking applications.

The above aspect of this disclosure is to ascertain from the resultant image, a gaze direction of the user or driver, for subsequent eye tracking applications.

In an embodiment, a system for processing images for eye tracking applications comprises a first illuminating source operable to transmit a first light ray towards a first gaze, and a second illumination source operable to transmit a second light ray towards a second gaze, an image sensor operable to capture a first gaze image comprising an image of the first gaze, and a second gaze image comprising an image of the second gaze, and a processing unit operable to process images captured by the image sensor, wherein the system further comprises a saturation spot removal algorithm operable to select a primary gaze image between the first gaze image captured and the second gaze image captured, and wherein the primary gaze image is selected for glare spot removal, to yield a resultant gaze image for ascertaining a gaze direction, for eye tracking applications.

The above described aspect of this disclosure yields a system for image processing, through a selection of a primary image from two or more images captured of a first gaze and a second gaze of a driver, to prepare for glare spot removal processing. Ideally, the selection of the primary image is on a basis that there is no overlapping glare spot interfering a glint spot position present in the image. Thus, the aforesaid image processing system yields a faster processing time.

In an embodiment, a system as described above, the image sensor, the first illumination source and the second illumination source are integrated as a single module.

The above aspect of this disclosure yields a single module comprising an image sensor, a first illumination source and a second illumination source such that the first illumination source and the second illumination source may be designed to be substantially in a straight line with a first gaze and a second gaze of a user. The image sensor may be arranged between the two illumination source such that glare spots from image captured can be separated out physically.

In an embodiment, a system as described above, each of the first illumination source and the second illumination source is operable to switch on and off in an alternating mode, such that when the first illumination source is switched on, the second illumination source is switched off; and when the first illumination source is switched off, the second illumination source is switched on.

The above aspect of this disclosure reduces the frames per second of an image sensor by half and increases observation coverage such that multiple gaze directions may be observed in at least one type of scenario. In the context herein, the different types of scenarios may be applicable to a user operating a motor vehicle.

The objective of this disclosure is solved by a computer program product as defined herein to cause the system as defined above to execute the steps of the method of disclosed above.

The above described aspect of this disclosure yields a computer program product suitable for image processing, through a selection of a primary image from two or more images captured of a first gaze and a second gaze of a driver, to prepare for glare spot removal processing.

The objective of this disclosure is solved by a computer-readable medium having stored thereon the computer program product as defined herein to cause the system as defined above to execute the steps of the method of disclosed above.

The above described aspect of this disclosure yields a computer-readable medium suitable for image processing, through a selection of a primary image from two or more images captured of a first gaze and a second gaze of a driver, to prepare for glare spot removal processing.

BRIEF DESCRIPTION OF DRAWINGS

Other objects and aspects of this disclosure will become apparent from the following description of embodiments with reference to the accompanying drawings in which.

Figure 1:
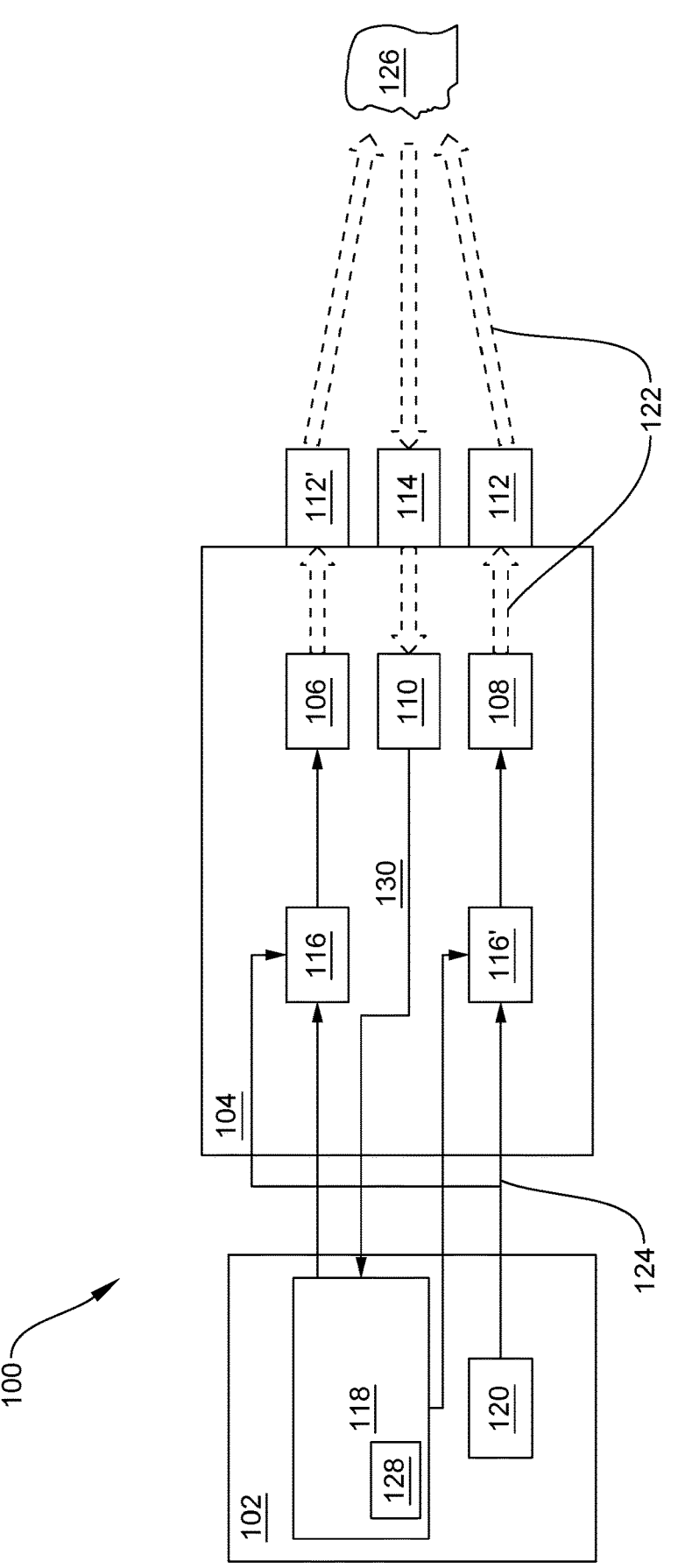
FIG. 1 shows a system block diagram of an image processing system in accordance with an embodiment.

In various embodiments described by reference to the above figures, like reference signs refer to like components in several perspective views and/or configurations.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description. It is the intent of this disclosure to present an image processing method for removal of glare spots appearing on images captured and system for the same.

Hereinafter, the term "glint" refers to reflection of small flash of light reflected off a surface. In the context used herein, 'a glint spot' may make reference to a reflection of small flash of light appearing on a cornea of a user's eye or gaze. The position o of a glint spot is used to determine or ascertain a gaze direction of the user.

The term "glare" refers to a ray of bright light transmitting towards cornea of human's eye, in which during some occasion, a glare may cause temporary blindness. By way of an example, 'a glare spot' may appear as a bright spot in images. Henceforth, in the context used herein, 'a glare spot' is an area which appears to be saturated pixel or saturated. In the context herein, the 'glare spot' is caused by at least one illumination light source reflected off reflective surfaces, such as a user's eyewear. The at least one illumination lights source is necessary to generate glint spot appearing in images captured.

The term "processing unit" used herein may broadly encompass a general-purpose processor, a central processing unit (CPU), a microprocessor, a digital signal processor (DSP), a controller, a microcontroller, a state machine, and so forth. Under some circumstances, a "processing unit" may refer to an application specific integrated circuit (ASIC), a programmable logic device (PLD), a field programmable gate array (FPGA), etc. The term "processing unit" may refer to a combination of processing devices, e.g., a combination of a DSP and a microprocessor, a plurality of microprocessors, one or more microprocessors in conjunction with a DSP core, or any other such configuration. The "processing unit" may include a memory, for loading a sequence of instruction, causing the "processing unit" to perform steps of actions. The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. "Memory" is said to be in electronic communication with a processor if the processor can read information from and/or write information to the memory. Memory that is integral to a processor is in electronic communication with the processor. Henceforth, the term "processing unit" may also be taken to encompass "system on chip" (SoC) which uses a single integrated circuit (IC) chip that contains multiple resources, computational units, processors and/or cores integrated on a single substrate. A single SOC may contain circuitry for digital, analog, mixed-signal, and radio-frequency functions, as well as any number of general purpose and/or specialized processors (digital signal processors, modem processors, video processors, etc.), memory blocks (e.g., ROM, RAM, Flash, etc.). Unless otherwise specifically stated, the "processing unit" is not limited to any specific combination of hardware circuitry and software, nor to any particular source for the instructions executed by the processing unit.

The term "first", "second" and the like used in the context of this disclosure may refer to modification of different elements in accordance with various exemplary embodiments, but not limited thereto. The expressions may be used to distinguish one element from another element, regardless of sequence of importance. By way of an example, "a first gaze image" and "a second gaze image" may refer to different gaze images, for example a left eye image or a right eye image or a left eye image and a subsequent left eye image, regardless of order of importance. On a similar note, a first gaze image may be referred to as the second gaze image and vice versa without departing from the scope of this disclosure.

FIG. 1 shows a system block diagram 100 of an image processing system in accordance with an embodiment. System 100 comprises a host board 102 and an imaging board 104. The host board 102 comprises a processing unit 118 with a saturation spot removal algorithm 118 stored thereon, and a power supply for supplying electrical power to the electronic components, such as the imaging board 104. The imaging board 104 comprises electronic components including a first illumination source 106, a second illumination source 108 and an image sensor 110 arranged between the first illumination source 106 and the second illumination source 108. An example of a suitable type of illumination source may be light emitting diodes (LED), vertical cavity surface emitting laser (VCSEL) and more in particular infrared (IR) LEDs. If IR LEDs are selected as illumination sources, a near infrared (NIR) image sensor will a suitable image sensor to use. The electronic components are driven by driver circuits 116, 116', which receives electrical power from power supply 120. As may be observed from FIG. 1, the electrical power lines supplied by the power supply 120 to the electronic components is represented by electrical power line 124. Optionally, the imaging board 104 may include illumination optics 112, 112' position forward of the first illumination source 106 and the second illumination source 108. Optionally, an imaging optic 114 may be positioned forward of the image sensor 110. The transmission of optical power between an object or user 126 is illustrated using optical power lines 122. When images are captured by the image sensor 110, data information is transmitted to the processing unit 118, to be processed by the saturation spot removal algorithm 128.

In an embodiment, the image sensor 110, the first illumination source 106 and the second illumination source 108 are integrated as a single module. This configuration requires the two illumination sources to be physically arranged with the image sensor positioned therebetween, such that glare spots from images caused by eyewear of users may be separated out physically. Although there is no preferred distance between the illumination sources and the image sensor, a larger distance between the illumination sources and the image sensor improves reduction of overlapping glare spots appearing in the images captured. The distance may be adjusted insofar as the glint spot remains visible in images captured. In an embodiment, the distance between the first illumination source and the second illumination source is approximately 10 cm apart, and more preferably, less than 10 cm apart.

Figure 2:
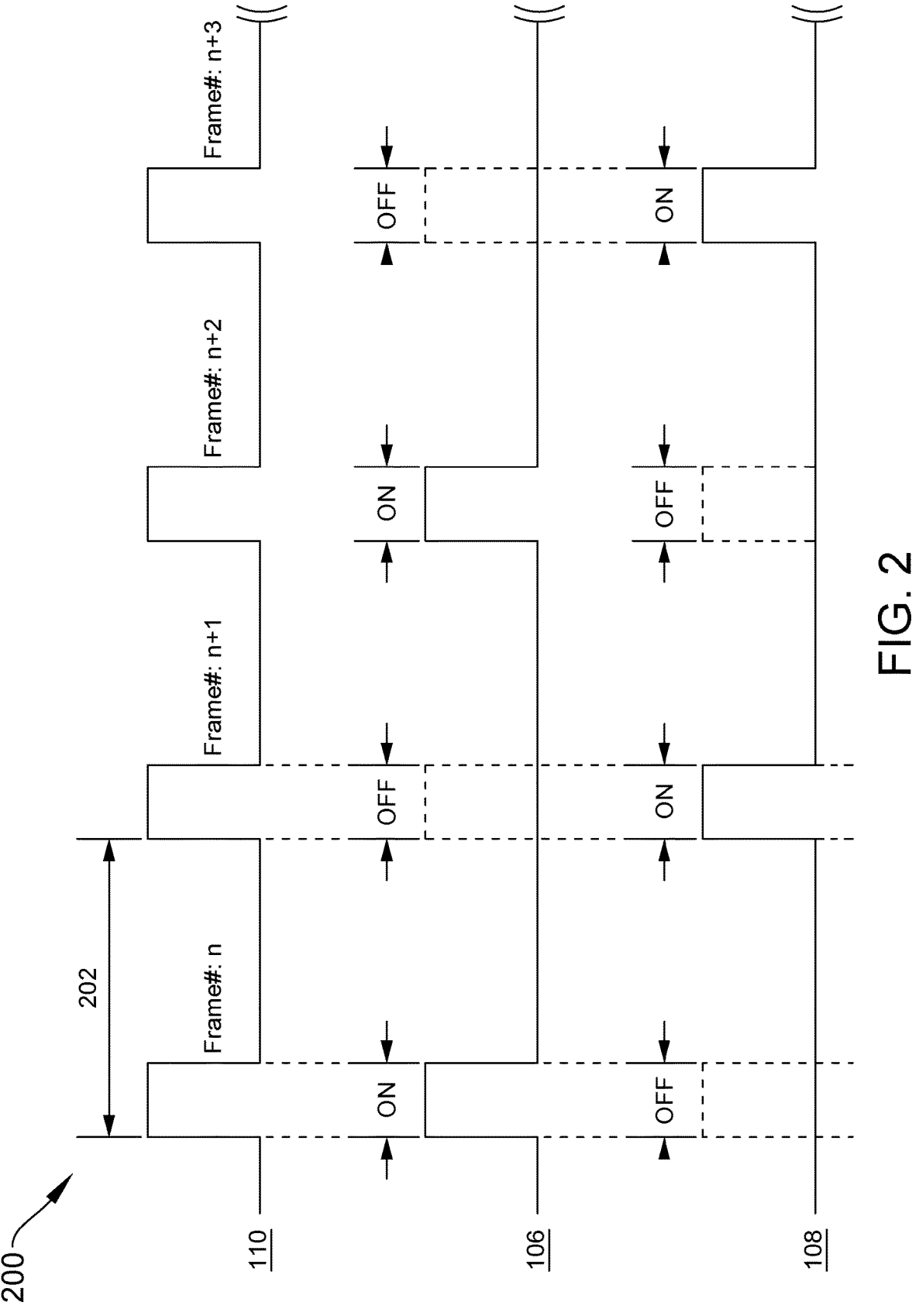
FIG. 2 shows a light switching time diagram of an image processing system in accordance with an embodiment.

FIG. 2 shows a light switching time diagram 200 of an image processing system in accordance with an embodiment.

In the time diagram 200, each time frequency cycle is represented by a square wave. For example, the first square wave from the top represents the frequency of the image sensor 100 capturing images in frames, namely frame n, frame n+1, frame n+2 and frame n+3, with an image frame data defined between frame, for example frame n and frame n+1. The second square wave from the top represents the time frequency cycle of the first illumination source 106, which is controlled by programmable logic of ON and OFF alternatingly. On a similar note, the last or the third square wave from the top represents the time frequency cycle of the third illumination source 108, which is controlled by a control logic of ON and OFF alternately. This circuit control signals can be achieved by either using the general input/output (GPIO) of the host board 102, programming software or additional programmable logic devices.

In an embodiment as shown in FIG. 2, when the control signal for the first illumination source 106 is to switch ON, the control signal for the second illumination source 108 is OFF and the image sensor 110 captures a first image. When the control signal for the first illumination source 106 is switched OFF, the control signal for the second illumination source 108 is ON and the image sensor 110 captures a second image. Therefore, an alternating switching mode is achieved using this control logic. When implemented by system 100, images are captured by the image sensor 110 with interleaved switching on/off the first illumination source 106 and the second illumination source 108.

Figure 3A:
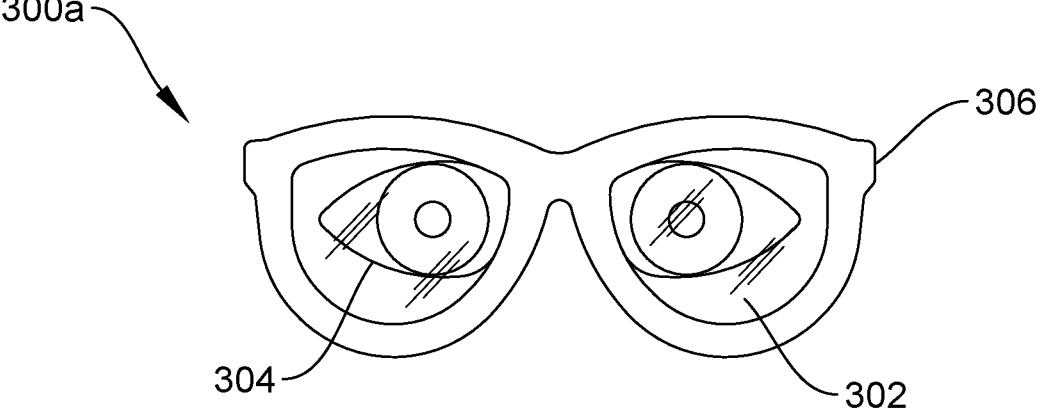
FIG. 3*a* shows a schematic diagram of an image processing system in accordance with an embodiment.
Figure 3A:
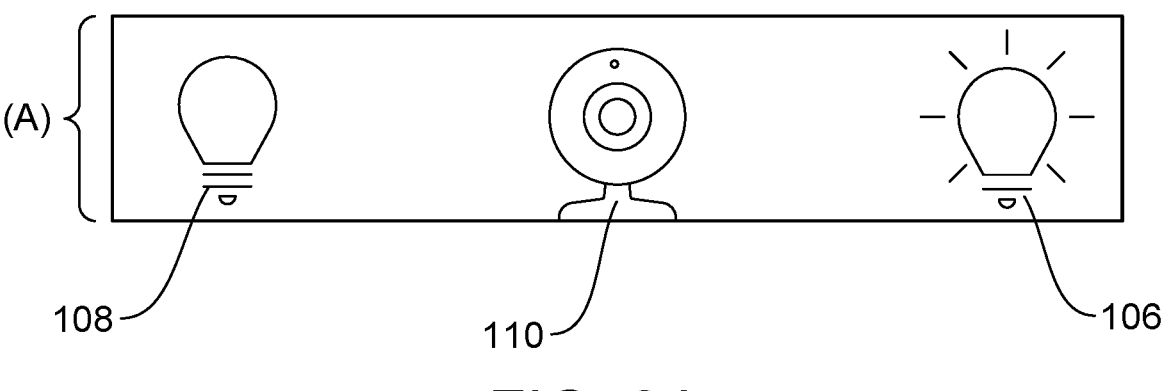
Figure 3B:
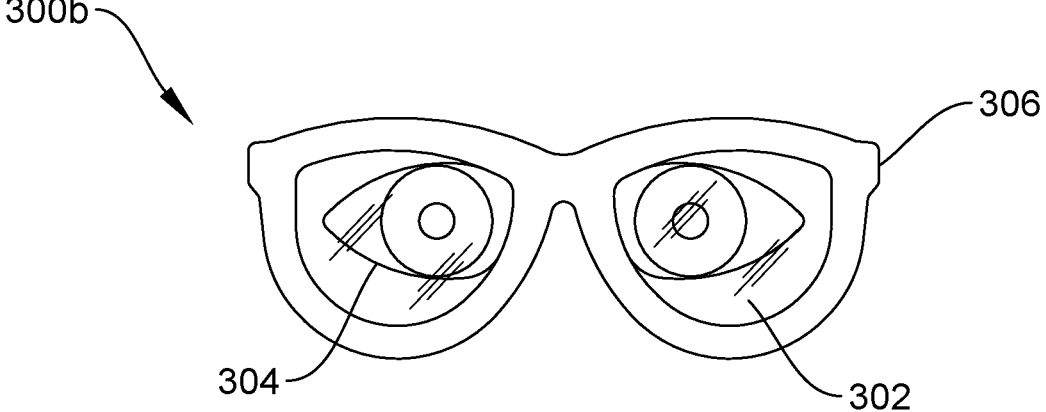
FIG. 3*b* shows a schematic diagram of an image processing system in accordance with an embodiment.
Figure 3B:
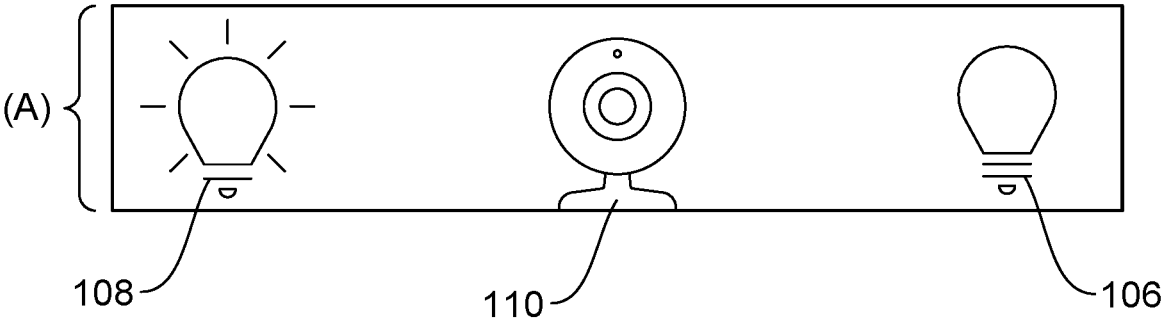

To illustrate the aspect of capturing images in an alternating mode, 300a of FIG. 3a shows schematic diagram of an alternating switching mode for a left eye of a user, and 300b of FIG. 3b shows an alternating switching mode for a right eye of a user.

In 300a, a first gaze 302 and a second gaze 304 of a user is shown, representing a left eye and a right eye of the user respectively. In this example, the user is wearing an eyewear 306, which is a common cause of transmission of light rays reflected off a reflective surface, towards the user's eye cornea, thus resulting in glare spots appearing in images captured. This is commonly due to light rays reflected off a part of an eyewear surface, for example a frame of an eyewear, transmitting towards the eye cornea.

In this embodiment, the user faces a single module (A) comprises a first illumination source 106, a second illumination source 108 and an image sensor 110. Applying the alternating switching mode as explained under FIG. 2, the first illumination source 106 is switched ON, thus transmitting a first light ray towards a first gaze 302, or a left gaze of the user. The second illumination source 108 remains OFF, thus no light ray is being transmitted to a second gaze 304 or the right eye of the user. In response to the transmission of the first light ray towards the first gaze, the image sensor 100 captures a first gaze image, or a left eye image of the user.

In 300b, the second illumination source 108 is switched ON, thereby transmitting a first light ray to towards a second gaze 304, or a right gaze of the user. The first illumination source 106 remains OFF, thus no light ray is being transmitted to a first gaze 302 or the left eye of the user. In response to the transmission of the second light ray towards the second gaze, the image sensor 100 captures a second gaze image, or a second eye image of the user.

The above-described alternating sequence of capturing a first gaze image and a second gaze image may be continuous. The alternating sequence may be a left eye-right eye sequence or a left eye-left eye followed up a right eye-right eye and left-eye, left-eye sequence. That is to say, the image sensor 110 may alternatively capture a left gaze image followed by a right gaze image, or two left gaze images followed by two right gaze images without departing from the main invention concept of this disclosure. Further, it shall be apparent to a skilled practitioner, modification to the method as disclosed herein, for example extending the illumination source switching on time, increasing image sensor exposure time, adjust gain setting, dynamically adjusting the illumination source driving current, and/or improve optical design, may yield better results without departing from the main disclosure concept.

By applying the above-described alternating illumination switching method, an image or several images captured may be utilized for eye tracking applications. A primary image may be selected by a saturation spot removal algorithm for further processing, to determine a gaze direction. Thus, the effective frame rate of the system disclosed herein is reduced by half. By way of an example, if an image sensor operates at 60 frame per second (fps), the actual usable image frame rate is reduced to 30 fps. A main advantage of reducing the effective frame rate is to increase observation coverage, to get at least two images captured under different observation scenarios. Despite a reduction in frame rate, the reduced frame rate is still sufficient for motor vehicular applications which requires eye tracking function, for example driver monitoring function in motor vehicles. Consequently, by reducing the actual usable image frame rate, the processing unit or the saturation spot removal algorithm is operable to identify glare spots or gaze direction in a very time efficient manner, with high accuracy. In the context of eye tracking applications within a motor vehicle, time efficiently is important, for example when displaying vehicle information in line-of-sight of driver, to ensure safety.

Hereinafter, the embodiments discussed using FIG. 4a to 4d illustrates multiple saturation spots identified in two gaze images for comparison during selection of a primary gaze image. For example, the following elements are referred to shows the types of glare spots which may appear in the images captured, where element 406 represents glare spot in the image captured caused by left illumination source reflected off an inner surface of eyewear, element 408 represents glare spot in the image captured caused by left illumination source reflected off an outer surface of eyewear, element 410 represents glare spot in the image captured caused by right illumination source reflected off inner surface of eyewear, element 412 represents a glare spot in the image captured caused by right illumination source reflected off outer surface of eyewear, element 414 represents a virtual glare spots area causing a shadow effect in the image captured when left illumination source is switched ON, element 416 represents a virtual glare spot area causing a shadow effect in the image captured when right illumination source is switched ON, and element 418 represents a glint spot appearing in the image captured.

For brevity and clarity, the first illumination source 106 shall be referred to as the left illumination source and the second illumination source 108 shall be referred to as the right illumination source in the following embodiments shown in FIG. 4a to 4d.

Figure 4A:
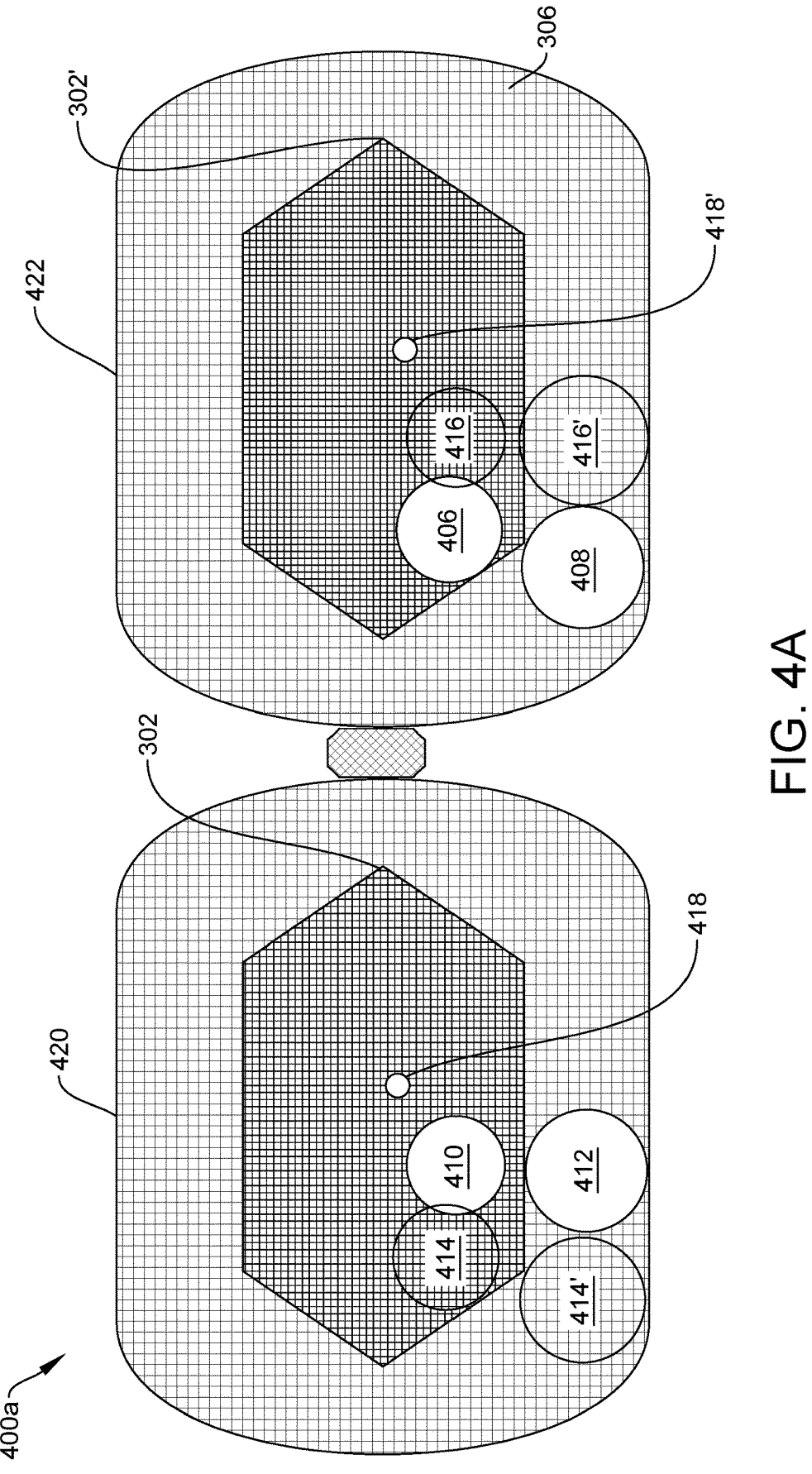
FIG. 4*a* shows a gaze mage captured by an image processing system in accordance with an embodiment.

FIG. 4a shows a gaze mage 400a captured by an image processing system 100 in accordance with an embodiment. As disclosed herein, the selection of primary gaze image is to determine the most ideal or promising gaze image from all the gaze images captured, regardless of left-eye or right-eye of the user. This reduces the time required to execute subsequent glare spots removal steps, thus yielding a faster image processing method.

As shown in FIG. 4a, both left-eye images are compared for selection of the primary gaze image. Gaze image 420 shows a left eye image captured when the illumination source corresponding to transmitting light rays to the right eye is switched on. In contrast, gaze image 422 represents a left eye image captured with the illumination source corresponding to transmitting light rays to the left eye is switched on. In other words, gaze image 420 shows a first image captured when the second illumination source 108 is switched on, while gaze image 422 shows a first image captured when the first illumination source 106 is switched on. As can be observed from FIG. 4a, element 414, 410, 414' and 412 appears as glare spots on the gaze image 420, but there is no overlap of glare spots covering a glint spot 418 of the user's eye image 302. The saturation spot removal algorithm may then select either one of the left side gaze images 422 or 424 as the primary image and continuously use the same primary gaze image selected for further processing, to prepare for applications which requires eye tracking function.

Figure 4B:
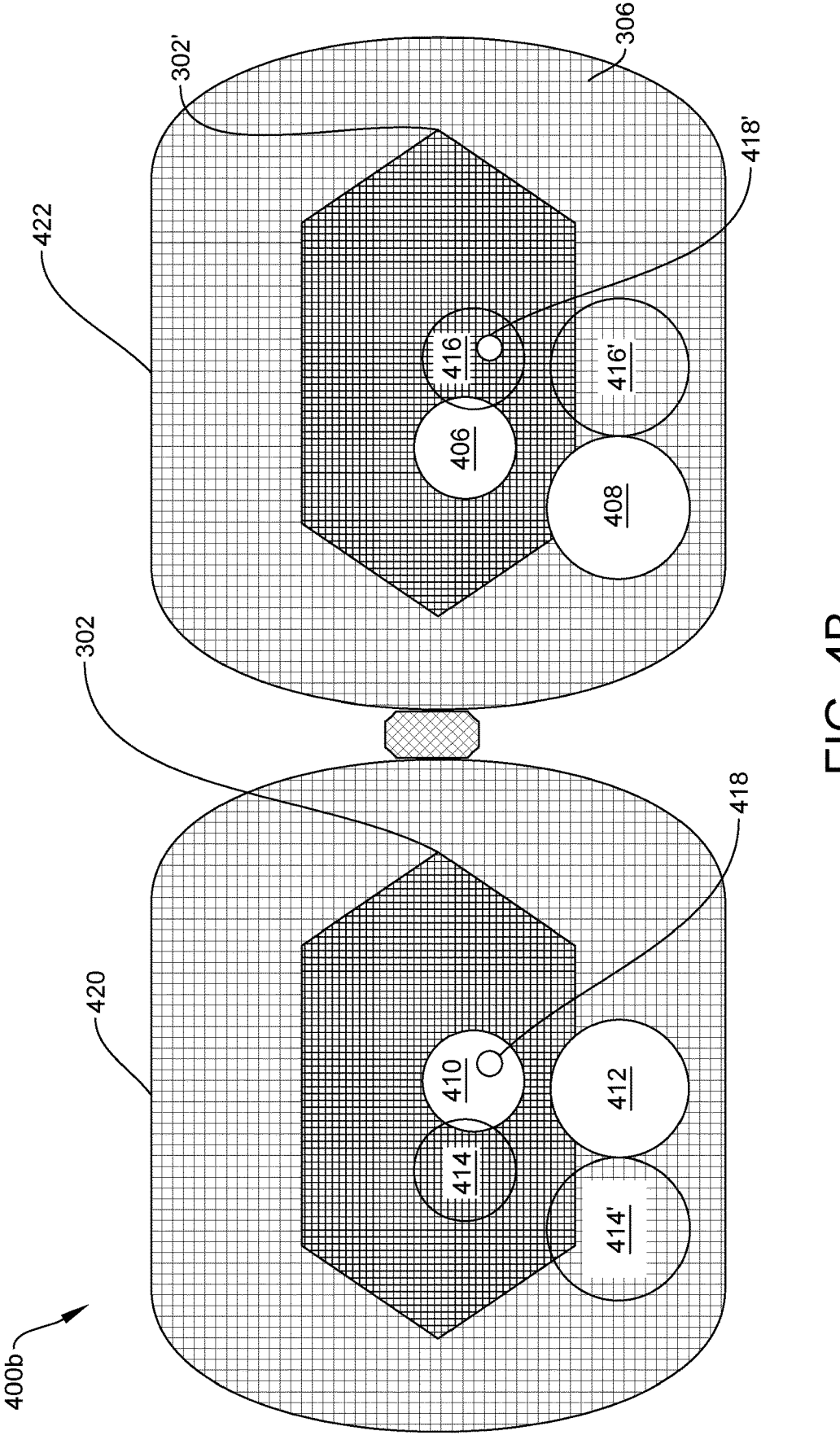
FIG. 4*b* shows a gaze mage captured by an image processing system in accordance with an embodiment.

FIG. 4b shows a first gaze mage 420 and a second gaze image 422 captured by an image processing system 100 in accordance with an embodiment. The first gaze image 420 represents a left eye image captured when right side illumination source 108 is switched on, while the second gaze image 422 represents a left eye image captured when left side illumination source 106 is switched on. The first gaze image 420 appears to have glare spots, i.e. element 414, 414', 410 and 412 appearing in the image. Similarly, the second gaze image 422 has glare spots element 406, 408, 416, 416' appearing on the image captured. Since element 416 is a virtual glare spot glare spot caused by right illumination reflecting from an inner surface of an eyewear, only the first gaze image 420 has an overlapping glare spot covering a glint spot 418. In such scenario, the saturation spot removal algorithm 128 identifies the glare spot or element 412 as a highly saturated spot or a saturated pixel spot. The saturation spot removal algorithm 128 may select gaze image 422 as the primary gaze image for eye tracking function processing, since gaze image 422 is deemed the more promising image to locate a glint spot based on comparison of gaze image 420 and gaze image 422.

Figure 4C:
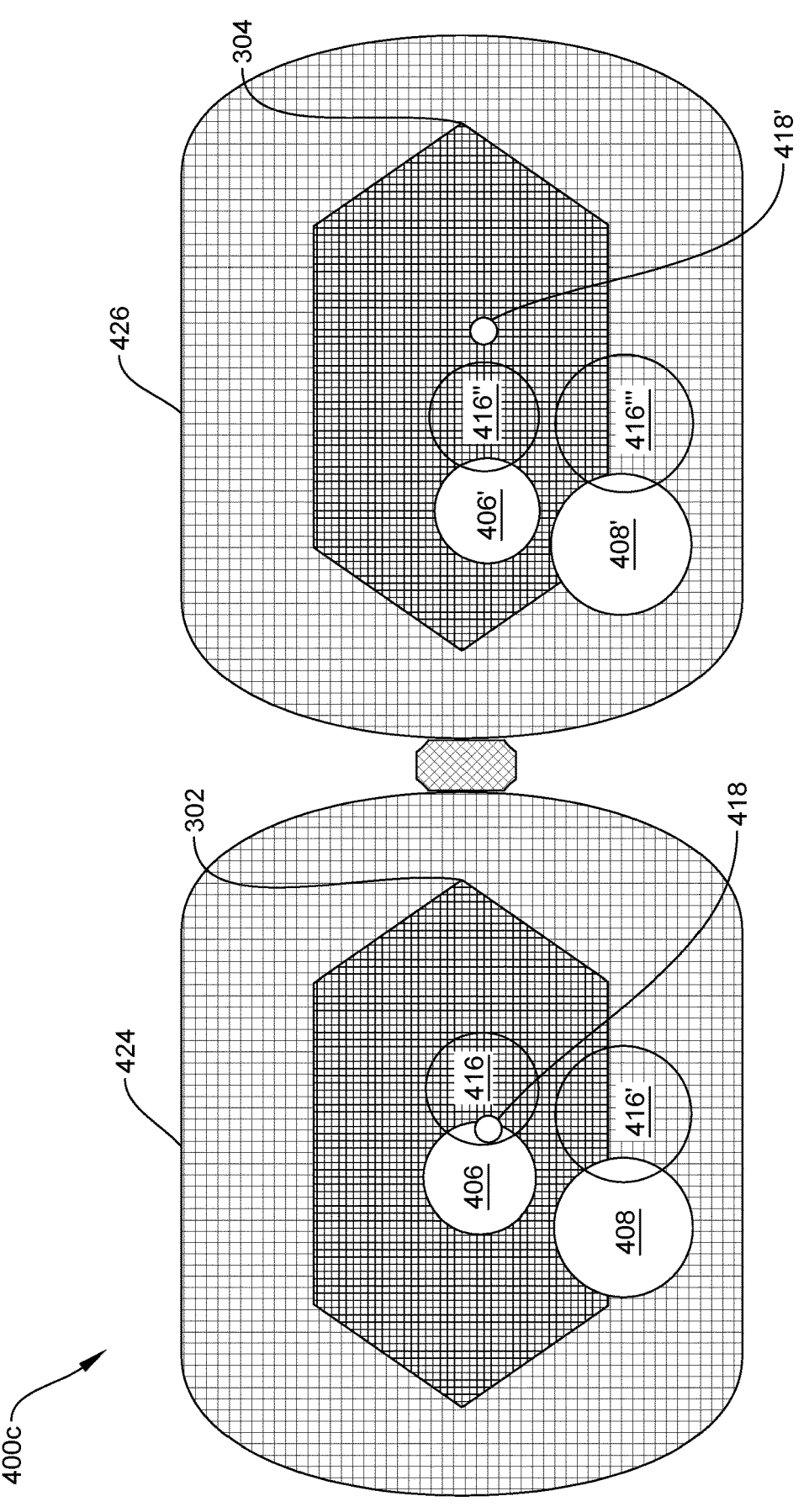
FIG. 4*c* shows a gaze mage captured by an image processing system in accordance with an embodiment.

FIG. 4c shows a first gaze image 424 and a second gaze image 426 captured by an image processing system 100 in accordance with an embodiment.

In this embodiment, the first gaze image 424 represents a left eye 302 of the user captured when the left illumination source 106 is switched on, and the second gaze image 426 represents a right eye 304 of the user captured when the left illumination source 106 is switched on, for selection of the primary gaze image. In this embodiment, the position of glint spot in the first gaze image 424 is covered by glare spots, in particular element 406 is overlapping with the glint spot 418. Consequently, the second gaze image 426 as the primary gaze image by the saturation removal spot algorithm 128 for further image processing to ascertain a gaze direction based on the primary gaze image selected.

Figure 4D:
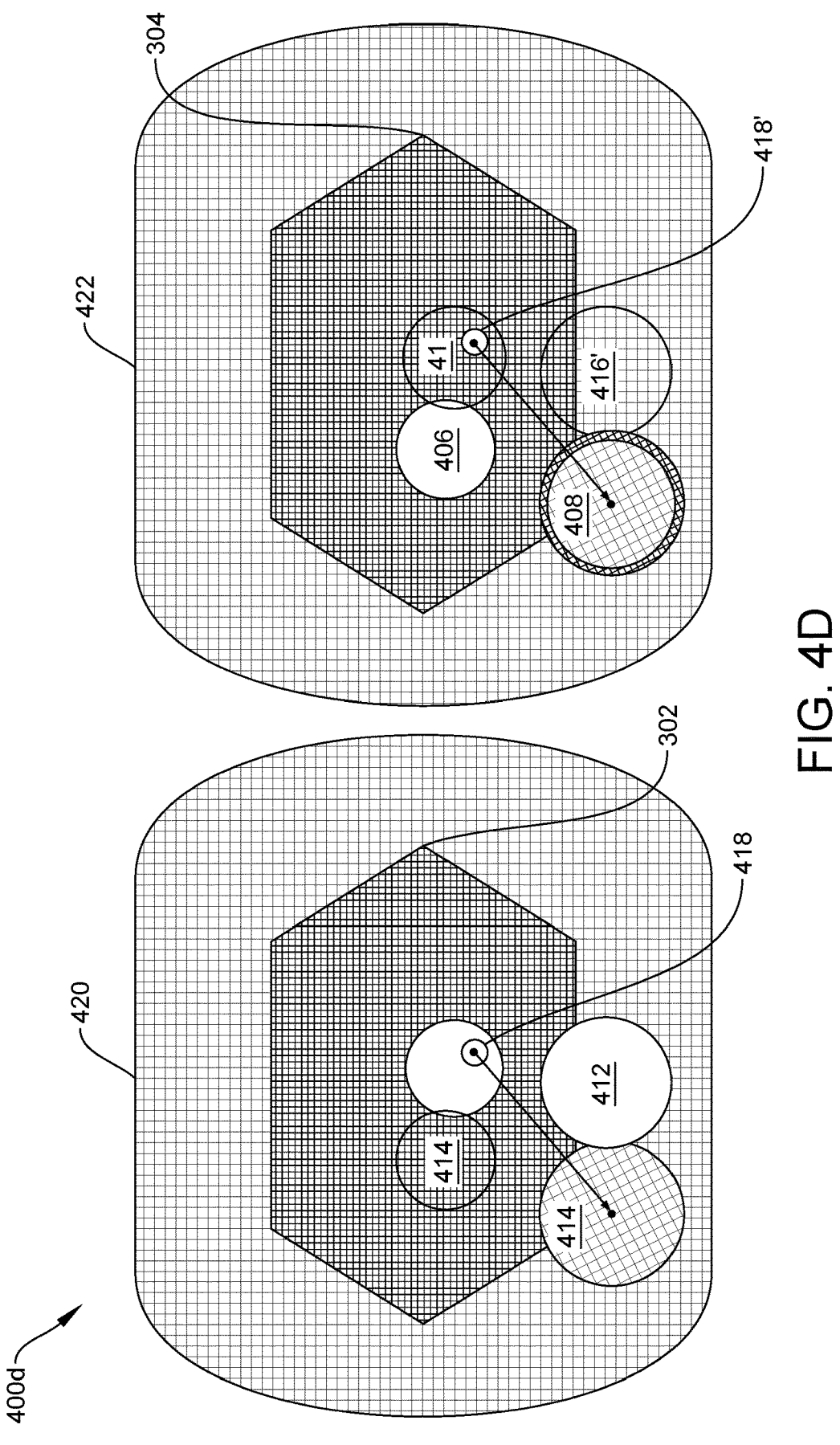
FIG. 4*d* shows an image for spot replacement process in accordance with an embodiment.

FIG. 4d shows a first gaze image 420 and a second gaze image 422 captured by an image processing system 100 in accordance with an embodiment.

In an embodiment, a weighted center of a saturated spot or a saturated pixel spot identified on the primary gaze image selected is calculated by the processing unit. As shown in FIG. 4d, a generic shape, for example a circle area (or any other applicable shapes) covers the whole area of the saturated pixel spot identified in one of the gaze images selected, i.e. a first gaze image 420. In a following step, the same generic shape is used to cover another gaze image selected, i.e. a second gaze image, having similar weighted center and replaced with pixels contained in the generic shape. In this example, the replacement area may be element 414 as shown in the first gaze image 420, appearing to be an encircled area represented by element 408 as shown in the second image 422. Advantageously, this process of replacement of corresponding pixel area or corresponding pixel spot mitigates loss of information during glare spot removal process.

Figure 5:
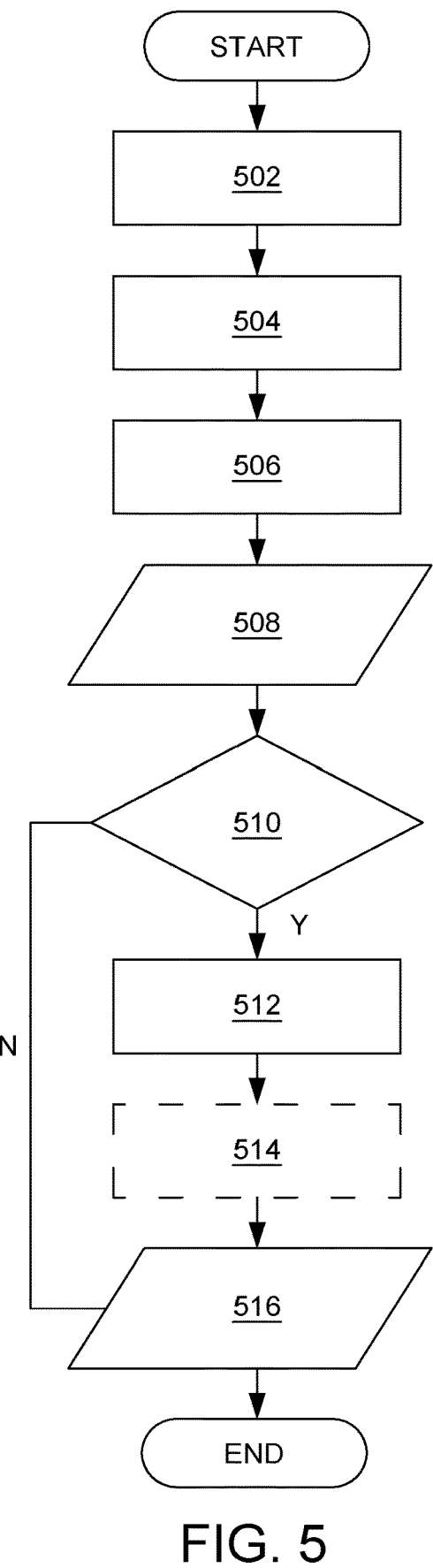
FIG. 5 shows a flowchart of an image processing method in accordance with an embodiment.

FIG. 5 shows a flowchart 500 of an image processing method in accordance with an embodiment.

In an embodiment, at step 502, a first light ray is transmitted towards a first gaze and a first gaze image is captured by an image sensor. In the next step 504, a second light ray is transmitted towards a second gaze and a second gaze image is captured by an image sensor. In both steps 502 and 504, the image sensor may be the same image sensor.

In another embodiment, the step of 502 is repeated, such that two first gaze images are captured in an initial sequence, and in a subsequent sequence, the step of 504 is repeated, such that two second gaze images are captured in the subsequent sequence.

In step 506, a process for selection of a primary gaze image is executed by comparing at least two different gaze images captured and identifying a gaze image with no glare spot overlapping a glint spot or least overlapping area of glare spot covering the glint spot. Once the selection is completed, a primary gaze image is yield in step 508. The steps 506 and 508 may be carried out by a saturation spot removal algorithm.

In step 510, the saturation spot removal algorithm identifies at least one saturation spot resembling a glare spot, and a saturation spot resembling a glint spot. The identification of saturation spot resembling a glare spot may be based upon two criteria, namely (1) the saturation spot appears only in one of the two gaze images used for primary image selection; (2) the glare spot size has a larger size compared to spot resembling a glint spot. The saturation spot may be classified as a saturated pixel spot.

In the event a saturation spot or glare spot is identified in the primary gaze image selected, a glare spot removal process is executed in the next step 512 (see explanation below). If no glare spot is identified in the primary gaze image selected, the primary gaze image is produced as a resultant image in step 516 for eye tracking applications.

Optionally, a step 514 may be executed to replace glare spot removed from the primary gaze image with a corresponding area or corresponding pixel spot obtained from the first gaze image or the second gaze image. Depending on which of the two images is selected as the primary gaze image, the other image is utilized for replacing the corresponding area or corresponding pixel spot. An advantage of this step 514 is to mitigate loss of data information due to glare spot removal process in step 512.

Once step 514 is completed, a resultant image is yielded at step 516. The glint spot that is present in the resultant image may be used to ascertain a gaze direction of the user, for eye tracking applications.

Thus, it may be seen that an image processing method and system for removal of glare spots from images for eye tracking applications having high accuracy with rapid processing time and reduced image frame rate has been provided. The reduction of image frame rate enables fast image process of moving objects and provides observation coverage to yield multiple images captured under different types of scenarios for ascertaining a gaze direction. While exemplary embodiments have been presented in the foregoing detailed description of the disclosure, it should be appreciated that a vast number of variation exist.

It should further be appreciated that the exemplary embodiments are only examples, and are not intended to limit the scope, applicability, operation or configuration of the disclosure in any way. Rather, the foregoing detailed description will provide those skilled in the art with a convenient road map for implementing an embodiment of the disclosure, it being understood that various changes may be made in the function and arrangement of elements and method of operation described in the embodiment without departing from the scope of the disclosure as set forth in the appended claims.

The invention claimed is:

1. An image processing method for removal of glare spots appearing on images captured, the method comprising:

transmitting, by way of a first illumination source, a first light ray towards a first gaze, and by way of a second illumination source, a second light ray towards a second gaze;

capturing, by way of an image sensor, a first gaze image comprising an image of the first gaze, and a second gaze image comprising an image of the second gaze; and selecting, by way of a saturation spot removal algorithm, a primary gaze image between the first gaze image captured and the second gaze image captured by comparing the first gaze image captured and the second gaze image captured and identifying a gaze image with no glare spot overlapping a glint spot or a gaze image with at least an overlapping area of glare spot covering the glint spot;

wherein the saturation spot removal algorithm identifies at least one saturation spot resembling a glare spot based upon the saturation spot appearing in only one of the first and the second gaze images, and wherein a size of the glare spot is larger than a saturation spot resembling the glint spot; and wherein the primary gaze image is selected for a saturation spot removal process, to yield a resultant gaze image for ascertaining a gaze direction, for eye tracking applications.

2. The method of claim 1, further comprising:

removing, by way of the saturation spot removal algorithm, the at least one saturation spot resembling the glare spot from the primary gaze image selected.

3. The method of claim 1, further comprising:

capturing, by way of the image sensor, the first gaze image and the second gaze image in a continuously alternating sequence.

4. The method of claim 3, wherein the continuously alternating sequence comprises:

capturing in an initial sequence the first gaze image in response to the first light rays being transmitted toward the first gaze; and capturing in a subsequent sequence, the second gaze image in response to the second light rays being transmitted toward the second gaze.

5. The method of claim 3, wherein the continuously alternating sequence further comprises:

continuously executing, by way of the saturation spot removal algorithm, one initial sequence for capturing the first gaze image, followed by one subsequent sequence for capturing the second gaze image.

6. The method of claim 3, wherein the alternating sequence further comprises:

continuously executing, by way of the saturation spot removal algorithm, at least two sequences of the initial sequence for capturing the first gaze image, followed by at least two sequences of the subsequent sequence for capturing the second gaze image.

7. The method of claim 1, wherein identifying the at least one saturation spot resembling the glare spot based upon the saturation spot appearing in only one of the first and the second gaze images, and wherein the size of the glare spot size is larger than the saturation spot resembling the glint spot, further comprises:

identifying, by way of the saturation spot removal algorithm, at least one saturated pixel area, by comparing the first gaze image captured against the second gaze image captured.

8. The method of claim 7, further comprising:

classifying, by way of the saturation spot removal algorithm, the saturated pixel area as the at least one saturation spot resembling the glare spot.

9. The method of claim 7, further comprising:

removing, by way of the saturation spot removal algorithm, the saturated pixel area resembling a glare spot from the primary gaze image; and replacing, by way of the saturation spot removal algorithm, the saturated pixel area resembling a glare spot with a corresponding area obtained from one of the first gaze image or the second gaze image captured.

10. The method of claim 1, further comprising:

determining, by way of the saturation spot removal algorithm, a glint spot present in the resultant gaze image.

11. A system for processing of images for eye tracking applications, the system comprising:

a first illuminating source operable to transmit a first light ray towards a first gaze; and a second illumination source operable to transmit a second light ray towards a second gaze;

an image sensor operable to capture a first gaze image comprising an image of the first gaze and a second gaze image comprising an image of the second gaze; and a processing unit operable to process images captured by the image sensor, wherein the system further comprises a saturation spot removal algorithm operable to select a primary gaze image between the first gaze image captured and the second gaze image captured by comparing the first gaze image captured and the second gaze image captured and identifying a gaze image with no glare spot overlapping a glint spot or a gaze image with at least an overlapping area of glare spot covering the glint spot;

wherein the saturation spot removal algorithm identifies at least one saturation spot resembling a glare spot based upon the saturation spot appearing in only one of the first and the second gaze images, and wherein a size of the glare spot is larger than a saturation spot resembling the glint spot; and wherein the primary gaze image is selected for a saturation spot removal process, to yield a resultant gaze image for ascertaining a gaze direction, the resultant gaze image for eye tracking applications.

12. The system of claim 11, wherein the image sensor, the first illumination source and the second illumination source are integrated as a single module.

13. The system of claim 11, wherein each of the first illumination source and the second illumination source is operable to switch on and off in an alternating mode, such that when the first illumination source is switched on, the second illumination source is switched off, and when the first illumination source is switched off, the second illumination source is switched on.

14. A system comprising:

a processing unit comprising a computer program product with instructions for:

transmitting, by way of a first illumination source, a first light ray towards a first gaze, and by way of a second illumination source, a second light ray towards a second gaze;

capturing, by way of an image sensor, a first gaze image comprising an image of the first gaze, and a second gaze image comprising an image of the second gaze; and selecting, by way of a saturation spot removal algorithm, a primary gaze image between the first gaze image captured and the second gaze image captured by comparing the first gaze image and the second gaze image and identifying a gaze image with no glare spot overlapping a glint spot or a gaze image with at least an overlapping area of glare spot covering the glint spot;

wherein the saturation spot removal algorithm identifies at least one saturation spot resembling a glare spot based upon the saturation spot appearing in only one of the first and the second gaze images, and wherein a size of the glare spot is larger than a saturation spot resembling the glint spot; and wherein the primary gaze image is selected for a saturation spot removal process, to yield a resultant gaze image for ascertaining a gaze direction, the resultant gaze image for eye tracking applications.

15. A non-transitory computer-readable medium with instructions for:

transmitting, by way of a first illumination source, a first light ray towards a first gaze, and by way of a second illumination source, a second light ray towards a second gaze;

capturing, by way of an image sensor, a first gaze image comprising an image of the first gaze, and a second gaze image comprising an image of the second gaze;

selecting, by way of a saturation spot removal algorithm, a primary gaze image between the first gaze image captured and the second gaze image captured by comparing the first gaze image captured and the second gaze image captured and identifying a gaze image with no glare spot overlapping a glint spot or a gaze image with at least an overlapping area of glare spot covering the glint spot;

wherein the saturation spot removal algorithm identifies at least one saturation spot resembling a glare spot based upon the saturation spot appearing in only one of the first and the second gaze images, and wherein a size of the glare spot is larger than a saturation spot resembling the glint spot; and wherein the primary gaze image is selected for a saturation spot removal process, to yield a resultant gaze image for ascertaining a gaze direction, the resultant gaze image for eye tracking applications.

* * * * *